US007882198B2

(12) United States Patent
Landau et al.

(10) Patent No.: US 7,882,198 B2
(45) Date of Patent: Feb. 1, 2011

(54) SHARED JAVA JAR FILES

(75) Inventors: Erez Landau, Netanya (IL); Dean R. E. Long, Boulder Creek, CA (US); Nedim Fresko, San Francisco, CA (US)

(73) Assignee: Oracle America, Inc., Redwood City, CA (US)

( * ) Notice: Subject to any disclaimer, the term of this patent is extended or adjusted under 35 U.S.C. 154(b) by 761 days.

(21) Appl. No.: 11/824,850

(22) Filed: Jul. 2, 2007

(65) Prior Publication Data

US 2010/0023702 A1   Jan. 28, 2010

(51) Int. Cl.
*G06F 15/167* (2006.01)
*G06F 12/08* (2006.01)
(52) U.S. Cl. .................. 709/214; 709/224; 711/147
(58) Field of Classification Search ............... 711/6, 711/203, 208, 147; 709/248, 214, 224; 718/1; 713/189
See application file for complete search history.

(56) References Cited

U.S. PATENT DOCUMENTS

| 6,738,977 | B1 | 5/2004 | Berry et al. | |
|---|---|---|---|---|
| 7,512,769 | B1 * | 3/2009 | Lowell et al. | 711/203 |
| 7,689,986 | B2 * | 3/2010 | Monnie et al. | 718/1 |
| 7,694,065 | B2 * | 4/2010 | Petev et al. | 711/6 |
| 7,716,377 | B2 * | 5/2010 | Harris et al. | 709/248 |
| 7,734,892 | B1 * | 6/2010 | Rozas et al. | 711/208 |
| 2006/0248350 | A1 * | 11/2006 | Stanev | 713/189 |

OTHER PUBLICATIONS

European Patent Office, "Communication", Foreign application No. 08252141.0, Nov. 11, 2008, 7 pages.
Current Claims for Application No. 08252141.0, 9 pages, Nov. 2008.
Corrie, "Java Technology: IBM Style Class Sharing," May 30, 2006, pp. 1-11, XP-002502139, http://www-128.ibm.com/developerworks/java/library/j-ibmjava4/index.html, retrieved on Oct. 31, 2008.
IBM Corp., "IBM SDk for z/OS platforms," May 2006, pp. 1-76, XP-002502140, http://www-03.ibm.com/servers/resources/sdkguide.pdf, retrieved on Oct. 31, 2008.

* cited by examiner

*Primary Examiner*—Jungwon Chang
(74) *Attorney, Agent, or Firm*—Osha • Liang LLP

(57) ABSTRACT

Techniques are disclosed for sharing programmatic modules among isolated virtual machines. A master JVM process loads data from a programmatic module, storing certain elements of that data into its private memory region, and storing other elements of that data into a "read-only" area of a shareable memory region. The master JVM process copies loaded data from its private memory region into a "read/write" area of the shareable memory region. Instead of re-loading the data from the programmatic module, other JVM processes map to the read-only area and also copy the loaded data from the read/write area into their own private memory regions. The private memory areas of all of the JVM processes begin at the same virtual memory address, so references between read-only data and copied data are preserved correctly. As a result, multiple JVM processes start up faster, and memory is conserved by avoiding the redundant storage of shareable data.

20 Claims, 2 Drawing Sheets

SHARED JAVA JAR FILES

BACKGROUND

Multiple JAVA virtual machines (JVMs) may concurrently execute on the same computing device. Each such JVM may execute within a separate process (referred to herein as a "JVM process") that is isolated from the other JVM processes that concurrently execute on the same computing device. Each of these JVM processes may consume a substantial amount of the computing device's memory. The quantity of memory that each JVM process consumes can limit the number of JVM processes that can be executed concurrently on the computing device.

A JVM process needs to load certain classes when that JVM process starts up. Loading these classes can require a substantial amount of time. When multiple JVM processes are to be executed concurrently, the amount of time required for all of these JVM processes to load such classes can become prohibitive.

Normally, when a JVM process starts up, the JVM process needs to load a class that is associated with a reference. The reference may be a symbolic name such as "java.lang.String," for example. The JVM process engages in a lookup process which involves a class loader. The class loader loads, from a file system, bytes to which the class corresponds. The class loader defines the class. The JVM process processes these bytes and loads these bytes into the JVM process' internal data structures (e.g., lookup tables) for fast access.

These data structure are typically stored in memory that has been allocated within the JVM process' private heap (i.e., private memory region). The JVM process may allocate this memory using the "malloc" call, for example. This memory region is writable, private memory that is not shared.

SUMMARY

Using techniques described herein, memory can be saved by taking tasks that multiple, independent, isolated JVM processes (considered collectively) perform repeatedly, and, instead of performing those tasks repeatedly, performing those tasks exactly once, and sharing, between the JVM processes, the results of performing those tasks. In one embodiment of the invention, classes that all of the JVM processes would otherwise independently load from programmatic modules such as JAVA JAR files are, instead, loaded only once, by one of the JVM processes, into shared memory that all of the JVM processes can access. Once these classes have been loaded into shared memory, multiple concurrently executing, isolated JVM processes may share these classes.

DETAILED DESCRIPTION OF EMBODIMENT(S)

Overview

Figure 1:
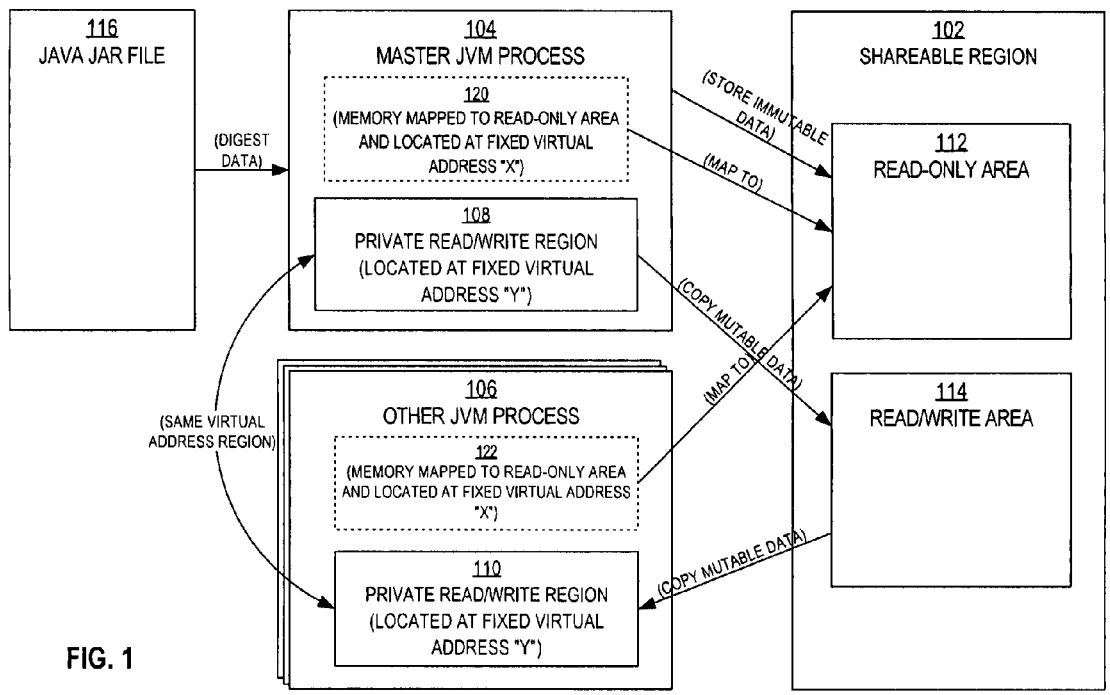
FIG. 1 is a block diagram that illustrates logical components and aspects of a system for sharing JAVA JAR files among multiple concurrently executing, isolated JVM processes, according to an embodiment of the invention.

FIG. 1 is a block diagram that illustrates logical components and aspects of a system for sharing JAVA JAR files among multiple concurrently executing, isolated JVM processes, according to an embodiment of the invention. In one embodiment of the invention, a computing device's memory is separated into distinct regions. One such region is a "shareable region" 102. Shareable region 102 is also called the "write once" region. Shareable region 102 is writeable by a "master" JVM process 104 during the time that master JVM process 104 is initializing. However, other JVM processes 106 that start up later merely read from, and do not write to, shareable region 102. These other JVM processes 106 may map to shareable region 102 in a "read-only" mode, for example. Additionally, each JVM process 104 and 106 has its own, separate, private "read/write" region (108 and 110) into which only that JVM process can write and from which only that JVM process can read. For example, each JVM process' private read/write region may be implemented as a separate static array that is pre-allocated at build time as part of the program space. Using UNIX "mmap" or a similar operating system request to allocate read-write regions 108 and 110 is another possibility.

In one embodiment of the invention, shareable region 102 further comprises both a "read-only" area 112 and a "read/write" area 114. Even though shareable region 102 includes an area that is called the read/write area, master JVM process 104 is actually the only JVM process that ever writes to read/write area 114 of shareable region 102.

During initialization, while master JVM process 104 is loading classes (typically, before any of those classes has been requested by any application), master JVM process 104 digests data from a JAVA JAR file 116 and places at least some of the digested data into shareable region 102. Depending on whether the entity (e.g., object or bytecode) to which the data corresponds is mutable, master JVM process 104 may place the data into either read-only area 112 of shareable region 102 or the master JVM process' own private read/write region 108. The data that master JVM process 104 stores into its own private read/write region 108 comprises the data that each JVM process 106 will need to execute programs.

The master JVM process' private read/write region 108 is located at a fixed virtual address (virtual address "Y" in FIG. 1) and is mapped to a specified, fixed virtual address region, the significance of which is discussed in greater detail below. In one embodiment of the invention, if read-only area 112 of shareable region 102 makes any references to read/write data, then those addresses must be within the master JVM process' fixed address region 108. In one embodiment of the invention, memory references/pointers in read-only area 112 can only point to addresses within read-only area 112 or read/write region 108. After master JVM process 104 has fully digested the data from JAVA JAR file 116, master JVM process 104 copies, into read/write area 114 of shareable region 102 (alternatives are discussed below), the data that is stored in the master JVM process' own private read/write region 108. Read/write area 114 of shareable region 102 is essentially a pre-initialized read/write memory.

In digesting data from JAVA JAR file 116, master JVM process 104 recognizes the methods and fields (collectively, "members") of each class in JAVA JAR file 116. For each such member, master JVM process 104 determines, based on that member's type, whether that member is mutable. If the member is mutable, then master JVM process 104 initially stores corresponding data for the member into the master JVM process' own private read/write region 108. Alternatively, if the member is immutable, then master JVM process 104 stores corresponding data for the member into read-only area 112 of shareable region 102. Essentially, data for any entities to which processes are able to write in the future is initially stored in the master JVM process' own private read/write region 108 (and later copied to read/write area 114 of shareable region 102). In contrast, data for entities to which processes are not able to write in the future is stored in read-only area 112 of shareable region 102.

For example, master JVM process 104 might store read-only "quickened" bytecodes into read-only area 112 of shareable region 102. In contrast, master JVM process 104 might store, into the master JVM process' own private read/write region 108, data that corresponds to a string object, to whose header processes can write to perform locking. However, master JVM process 104 might store, into read-only area 112 of shareable region 102, data that corresponds to an array of bytes that is a sub-object of that string object, because such an array is immutable.

In one embodiment of the invention, whenever any other JVM process 106 starts up after master JVM process 104 has performed the tasks discussed above, that JVM process 106 attaches to shareable region 102 and copies, from shareable region 102, into that JVM process' own private read/write region 110, all of the data that is contained in read/write area 114 of shareable region 102. This data is referred to below as the "copied data." JVM processes 106 do not need to make their own copies of the data that is stored in read-only area 112 of shareable region 102, because all of the data stored in read-only area 112 is immutable. Thus, all of JVM processes 106 can read from the single copy of the data that is stored in read-only area 112 without making a private copy of that data. For example, all of the JVM processes may "map" memory (shown as mapped memory regions 120 and 122, all of which begin at a fixed virtual address "X" as shown in FIG. 1) to read-only area 112 of shareable region 102.

Data that corresponds to an object that is stored in read-only area 112 of shareable region 102 may contain a reference to data that corresponds to an object that is stored in a JVM process' private read/write region 110, and vice-versa. Therefore, in one embodiment of the invention, private read/write regions of all of the JVM processes (including master JVM process 104) that execute on the same computing device occupy the same virtual address region. As a result, the copied data can be found at the same fixed virtual address in each JVM process' private read/write region 110. Even if the contents of one JVM process' read/write region 110 differ from the contents of other JVM processes' read/write regions 110, the beginning of each JVM process' read/write region 110 will be at the same fixed virtual address (located at fixed virtual address "Y" as shown in FIG. 1). As a result, if there is a reference, in read-only area 112 of shareable region 102, to a virtual address in a JVM process' read/write region 110, the virtual address to which that reference refers will be correct.

According to one embodiment of the invention, all references (e.g., pointers) from read-only area 112 of shareable region 102 to the copied data refer to fixed memory addresses. According to one embodiment of the invention, if read-only area 112 of shareable region 102 contains references to addresses within read-only area 112, then read-only area 112 must be located at a fixed memory address that all of the JVM processes 104 and 106 executing on the same computing device recognize. In one embodiment of the invention, read/write area 114 can reference data that is stored in read-only area 112. Additionally, read-only area 112 may contain internal references to data that is stored in read-only area 112. A pointer in a read-write section that refers to an address within a read-write section could be patched, thereby allowing the latter read-write section to be relocated. A pointer in a read-write section that refers to a read-only section also could be patched, thereby allowing the read-only section to be relocated. A pointer in a read-only section that refers to an address in a read-write section cannot be patched, so, in one embodiment of the invention, if such a pointer is allowed, then the read-write section must be at a fixed address. A pointer in a read-only section that refers to an address in a read-only section cannot be patched, so, in one embodiment of the invention, if such a pointer is allowed, then the latter read-only section must be at a fixed address. In embodiments of the invention in which pointers are not patched, both read-only and read-write areas must be at fixed addresses. However, in embodiments of the invention in which pointers are patched or in which position-independent references were used, the read-only and/or the read-write sections could be relocated and consequently do not need to be at fixed addresses.

The fixed virtual address at which each JVM process' private read/write region 110 begins may be specified in each JVM process' code. Alternatively, the fixed virtual address at which each JVM process' private read/write area 110 begins may be specified in a configuration file from which each JVM process 106 can read. The fixed virtual address may be a link-time constant.

Other JVM processes 106 can use data that master JVM process 104 has already "digested." Other JVM processes 106 may, under some circumstances, need to digest some JAR files, but not any JAR files that already have been digested. Master JVM process 104 might only digest some of the JAR files. Even so, in many cases, avoiding the re-digesting of JAR files that already have been digested significantly decreases the time required for other JVM processes 106 to start up. Additionally, because all of JVM processes 104 and 106 share a single copy of the data in read-only area 112 of shareable region 102 instead of making separate copies of that data, the memory of the computing device on which JVM processes 104 and 106 execute is significantly conserved in many cases. This conservation of memory may permit a greater number of JVM processes 106 to execute concurrently on the computing device than would be permitted if the memory were not conserved in this manner.

The techniques by which master JVM process 104 determines whether a particular entity (e.g., object or bytecode) is mutable may vary in various embodiments of the invention. In one embodiment of the invention, each item of data is associated with a "tag" that indicates whether that data is the kind of data that should be loaded into read-only area 112 of shareable region 102 or the master JVM's private read/write region 108. In such an embodiment of the invention, for each item of data, master JVM process 104 makes the determination based at least in part on the tag that is associated with that item of data. However, in alternative embodiments of the invention, master JVM process 104 may make the determination in other ways.

Segregated Shareable Regions

In one embodiment of the invention, all of the data that the master JVM process places into a shareable region is placed into the same shareable region, even if the master JVM process loaded different portions of that data from separate JAVA JAR files. As a consequence of this, data from separate JAVA JAR files might not be segregated by JAR file when the master JVM process copies that data into the read/write area of the shareable region; it might not be possible to tell, from the read/write area of the shareable region, which data came from which JAVA JAR file. As a result, in such an embodiment of the invention, when other JVM processes copy data from the read/write area of the shareable region into their own private read/write regions, these other JVM processes do not have the option of copying only the data that came from selected JAVA JAR files and not the data that came from other JAVA JAR files. Under circumstances where the other JVM processes do not need all of the data that the master JVM process loaded, the other JVM processes might end up copying more data than they actually needed to copy.

To solve this potential problem, in one embodiment of the invention, the master JVM process establishes a separate shareable region for each separate JAVA JAR file from which the master JVM process loads data. For each JAVA JAR file, the master JVM process loads/copies the data from that JAVA JAR file into only the shareable region that corresponds to that JAVA JAR file.

Alternatively, in one embodiment of the invention, the master JVM process establishes a single shareable region, but establishes a separate pair of read-only and read/write areas in that shareable region for each separate JAVA JAR file from which the master JVM process loads data. For each JAVA JAR file, the master JVM process loads/copies that data from that JAVA JAR file into only the read-only and read/write areas that correspond to that JAVA JAR file.

Thus, in one embodiment of the invention, the master JVM processes data from all of the JAVA JAR files that contain any data that any of the other JVM processes might use. Later, these other JVM processes can select the read-only areas to which they will map and the read/write areas from which they will copy data into their own private read/write regions.

Function Pointer Vectors

Class paths indicate the contexts in which classes are loaded. Sometimes, some of these contexts are interlinked so that classes loaded in these contexts are "aware" of each other. Other times, some of these contexts are not interlinked, so that classes loaded in one context are not "aware" of classes loaded in another context.

A "boot" class path might include system classes that are needed for any JVM process to execute any program. A specific "application" class path might include application classes that are needed for a JVM process to execute a specific application program, but which might not be needed for that JVM process to execute other application programs.

Typically, JVM processes load classes (e.g., from JAVA JAR files) using class loaders. Different classes may be loaded by different class loaders. For example, a boot class loader might load all of the system classes, while other class loaders might load application classes for specific applications. In one embodiment of the invention, each class loader is associated with a separate vector of function pointers.

In one embodiment of the invention, whenever master JVM process 104 is going to load a class (using techniques described above, for example), master JVM process 104 determines whether that class is going to be loaded by the boot class loader or by some other class loader. In one embodiment of the invention, if the class is going to be loaded by the boot class loader, then master JVM process 104 provides a "boot" vector of function pointers to the boot class loader. In one embodiment of the invention, if the class is going to be loaded by some other class loader, then master JVM process 104 provides a "default" vector of function pointers to that class loader.

In one embodiment of the invention, the class loader receives the vector of function pointers that are provided to that class loader. The vector includes pointers to different functions for different types of operations that the class loader might need to perform. For example, each vector might include at least one pointer to (a) a function that the class loader should call when the class loader needs to allocate memory for bytecodes, (b) a function that the class loader should call when the class loader needs to allocate memory for an interned string, and (c) a function that the class loader should call when the class loader needs to free previously allocated memory. In one embodiment of the invention, when a class loader needs to perform an operation of a particular operation type, that class loader calls the function to which the function pointer for that particular operation type points, as indicated by the function pointer vector that the class loader is using.

Although each function pointer vector might include a function pointer for each type of operation that a class loader might need to perform, in different vectors, the function pointers for the same type of operation may point to different functions. For example, the function to which the function pointer in the "boot" vector points for an "allocate bytecode" type of operation may differ from the function to which the function pointer in the "default" vector points for the same "allocate bytecode" type of operation. More specifically, the function to which the "boot" vector points might cause the class loader to allocate memory for a bytecode in read-only area 112 of shareable region 102, while the function to which the "default" vector points might cause the class loader to allocate memory for the bytecode in a JVM process' heap using the traditional "malloc" approach.

Thus, in one embodiment of the invention, different class loaders use different function pointer vectors to perform the operations that those class loaders perform when those class loaders load data from JAVA JAR files during the JVM start up process. In such an embodiment of the invention, all of the classes that are loaded by the same class loader are loaded using the same function pointer vector that is associated with that class loader.

Although the description above refers to the "boot" function pointer vector and the "default" function pointer vector in order to portray an example that is easily understood, various embodiments of the invention may involve a greater number of different function pointer vectors than those specifically discussed above.

In one embodiment of the invention, different function pointer vectors are associated with different JAVA JAR files. In such an embodiment of the invention, each class loader that loads classes from a specific JAVA JAR file uses the function pointer vector that is associated with that specific JAVA JAR file when loading classes form that specific JAVA JAR file. This feature is especially useful in embodiments in which data from different JAVA JAR files are to be loaded and/or copied into different shareable regions or different areas of the same shareable region, as is discussed above.

Extensions and Alternatives

As is discussed above, in one embodiment of the invention, master JVM process 104 stores, into read/write area 114 of shareable region 102, data that corresponds to mutable entities. However, in an alternative embodiment of the invention, master JVM process 104 stores such data into a file on persistent non-volatile storage instead of, or in addition to, shareable region 102, and other JVM processes 106 read the data from this file into their own private read/write regions 110. Thus, the "prototype" mutable data that other JVM processes 106 need to copy may be made persistent.

As is discussed above, in one embodiment of the invention, master JVM process 104 stores data that corresponds to mutable entities in the master JVM process' own private read/write region 108 prior to copying the contents of that region to read/write area 114 of shareable region 102. However, in one embodiment of the invention, at least some of the data that corresponds to mutable entities might not be handled in this manner. Instead, in one embodiment of the invention, if data that corresponds to a mutable entity is not referenced from read-only area 112 of shareable region 102 or from static memory (including any build-time ROMized structures), then the memory into which that data will be stored may be allocated regularly using "malloc." Other JVM processes do not need to copy such unreferenced data from read/write area 114 of shareable region 102, so master JVM process 104 does not need to copy such unreferenced data into read/write area 114 of shareable region 102. In one embodiment of the invention, temporary memory that needs to be freed, and memory that is unrelated to class loading, also is allocated regularly using "malloc."

In one embodiment of the invention, all references from static memory to either read-only area 112 or read/write area 114 of shareable region 102 are identified. These references are then patched in each JVM process that uses shareable region 102.

In one embodiment of the invention, the "master" JVM process on a computing device is the first JVM process to start up on that computing device. In one embodiment of the invention, whenever a JVM process starts up, that JVM process determines whether it is the first JVM process to start up. If that JVM process determines that it is the first JVM process to start up, then that JVM process assumes the role of master JVM process, and begins to load data from the JAVA JAR files using the techniques discussed above. Alternatively, if that JVM process determines that it is not the first JVM process to start up, then, instead of re-loading data from the JAVA JAR files, that JVM process maps to the already-established read-only area of shareable region 102 and copies, from read/write area 114 of shareable region 102, into its own private read/write region, the copy of the data that master JVM process 104 previously placed there. A JVM process may determine whether it is the first JVM process to start up by determining whether a shareable region already exists, for example. If shareable region 102 already exists, then the JVM process may assume that some other JVM process, which has already assumed the role of master JVM process, created shareable region 102. In one embodiment of the invention, when a JVM process starts up, it determines (e.g., using a hash code) whether data existing in memory is fresh (the data might be stale if it was stored before the most recent version of the JVM was compiled), and, if the data is not fresh, then the JVM process creates a new, refreshed version of the data. In one embodiment of the invention, each JVM process performs a "sanity check" on the addresses of any data existing in shareable region 102 before proceeding to use that data. In an alternative embodiment of the invention, each JVM process additionally or alternatively performs such a "sanity check" on the starting address of shareable region 102.

Although some embodiments of the invention are described above in the context of JVMs and JAVA JAR files, alternative embodiments of the invention may be applied in the contexts of virtual machines other than JVMs and/or in the contexts of programmatic modules other than JAVA JAR files. Embodiments of the invention are applicable in any context in which a virtual machine loads data from a programmatic module.

Embodiments of the invention described above are described generally in the context of a virtual machine loading data from a programmatic module. However, whenever a virtual machine starts up, there might be tasks, other than loading data from a programmatic module, which such a virtual machine typically needs to perform before the virtual machine can execute a program. In one embodiment of the invention, when master JVM process 104 starts up, master JVM process 104 digests and loads, into a shareable region, data that did not originate from a JAVA JAR file. Typically, an initial thread of execution of master JVM process 104 creates stacks. Although these stacks might not be read-only, they might refer to data entities which are always the same. In one embodiment of the invention, master JVM process 104 stores these stacks in read/write area 114 of shareable region 102, thereby "pre-initializing" the stacks for other JVM processes 106. In one embodiment of the invention, master JVM process 104 stores or copies, to shareable region 102, any data (a) that will be the same for other JVM processes 106 and (b) that other JVM processes 106 otherwise will need to process themselves, independently. Some runtime-generated lookup tables are examples of such data.

For example, one such table might contain data related to "JIT intrinsics." Master JVM process 104 might store this table in shareable region 102. Such a table may initially exist in a compressed form, but may be uncompressed into a data structure that is more convenient for accessing at runtime. Thus references below to the table may alternatively refer to the data structure into which the table has been uncompressed. Another JVM process 106 might need to access this table. Master JVM process 104 acquired the address of the table when master JVM process 104 stored the table in read-only area 112. Thus, master JVM process 104 has a pointer to the table. In one embodiment of the invention, shareable region 102 additionally contains (e.g., in read/write area 114 or in a separate dedicated area) a list of addresses that will need to be patched in order to make the data in the read-only and read-write areas 112 and 114 visible to other JVM processes 106. The list is read and the addresses in the JVM process' private read/write regions 110 are patched, as indicated in the list, to refer to the correct memory locations in shareable region 102. A patch record generally comprises an address and data. As a result of the patching, other JVM processes 106 also have, in their private read/write regions 110, pointers to the table in shareable region 102. In one embodiment of the invention, master JVM process 104 creates this list of addresses, and other JVM processes 106, upon determining that they are not the master JVM process, read the list and apply it to their address spaces. Generally, the list includes addresses that correspond to pointers that were inconvenient to relocate.

Some of a JVM process' startup operations might be best deferred until after class loading from a particular JAVA JAR file has finished, at which time those operations might be performed as part of a "post-processing" pass. For example, in one embodiment of the invention, after all of the classes from a particular JAVA JAR file have been loaded, but before a JVM process concludes the start-up process, that JVM process inspects all of the classes and determines whether all of the bytecodes have been quickened, whether all of the symbols have been resolved, and whether all of the constant pool entries have been resolved. For another example, in one embodiment of the invention, post-processing involves protecting data that has already been written to memory, to ensure that if that data was meant to be read-only, that data remains read-only relative to all of the JVM processes. In one embodiment of the invention in which a JVM process loads classes from multiple separate JAVA JAR files, the JVM process performs these post-processing operations after loading data from one JAR file and before commencing to load data from another JAR file.

The *JAVA Virtual Machine Specification*, Second Edition, by Tim Lindholm and Frank Yellin, is incorporated by reference herein. The following patents are also incorporated by reference herein: U.S. Pat. No. 5,815,718, filed May 30, 1996; U.S. Pat. No. 5,966,542, filed Aug. 10, 1998; and U.S. Pat. No. 6,223,346, filed Oct. 12, 1999.

Hardware Overview

Figure 2:
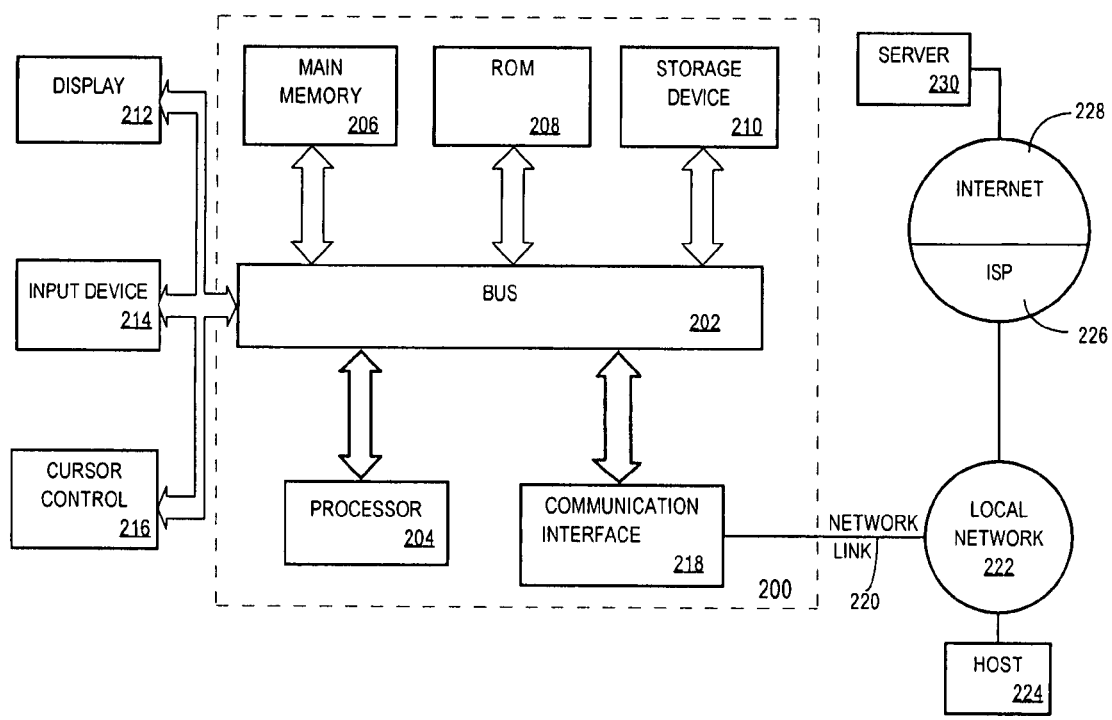
FIG. 2 is a hardware block diagram of an example computer entity, upon which certain embodiments of the invention may be implemented.

FIG. 2 is a block diagram that illustrates a computer system 200 upon which an embodiment of the invention may be implemented. Computer system 200 includes a bus 202 for facilitating information exchange, and one or more processors 204 coupled with bus 202 for processing information. Computer system 200 also includes a main memory 206, such as a random access memory (RAM) or other dynamic storage device, coupled to bus 202 for storing information and instructions to be executed by processor 204. Main memory 206 also may be used for storing temporary variables or other intermediate information during execution of instructions by processor 204. Computer system 200 may further include a read only memory (ROM) 208 or other static storage device coupled to bus 202 for storing static information and instructions for processor 204. A storage device 210, such as a magnetic disk or optical disk, is provided and coupled to bus 202 for storing information and instructions.

Computer system 200 may be coupled via bus 202 to a display 212, such as a cathode ray tube (CRT), for displaying information to a computer user. An input device 214, including alphanumeric and other keys, is coupled to bus 202 for communicating information and command selections to processor 204. Another type of user input device is cursor control 216, such as a mouse, a trackball, or cursor direction keys for communicating direction information and command selections to processor 204 and for controlling cursor movement on display 212. This input device typically has two degrees of freedom in two axes, a first axis (e.g., x) and a second axis (e.g., y), that allows the device to specify positions in a plane.

In computer system 200, bus 202 may be any mechanism and/or medium that enables information, signals, data, etc., to be exchanged between the various components. For example, bus 202 may be a set of conductors that carries electrical signals. Bus 202 may also be a wireless medium that carries wireless signals between one or more of the components. Bus 202 may also be a medium that enables signals to be capacitively exchanged between one or more of the components. Bus 202 may further be a network connection that connects one or more of the components. Overall, any mechanism and/or medium that enables information, signals, data, etc., to be exchanged between the various components may be used as bus 202.

Bus 202 may also be a combination of these mechanisms/media. For example, processor 204 may communicate with storage device 210 wirelessly. In such a case, the bus 202, from the standpoint of processor 204 and storage device 210, would be a wireless medium, such as an electromagnetic wave. Further, processor 204 may communicate with ROM 208 capacitively. In this instance, the bus 202 would be the medium that enables this capacitive communication to take place. Further, processor 204 may communicate with main memory 206 via a network connection. In this case, the bus 202 would be the network connection. Further, processor 204 may communicate with display 212 via a set of conductors. In this instance, the bus 202 would be the set of conductors. Thus, depending upon how the various components communicate with each other, bus 202 may take on different forms. Bus 202, as shown in FIG. 2, functionally represents all of the mechanisms and/or media that enable information, signals, data, etc., to be exchanged between the various components.

The invention is related to the use of computer system 200 for implementing the techniques described herein. According to one embodiment of the invention, those techniques are performed by computer system 200 in response to processor 204 executing one or more sequences of one or more instructions contained in main memory 206. Such instructions may be read into main memory 206 from another machine-readable medium, such as storage device 210. Execution of the sequences of instructions contained in main memory 206 causes processor 204 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 200, various machine-readable media are involved, for example, in providing instructions to processor 204 for execution. Such a medium may take many forms, including but not limited to, non-volatile media, volatile media, and transmission media. Non-volatile media includes, for example, optical or magnetic disks, such as storage device 210. Volatile media includes dynamic memory, such as main memory 206. Transmission media includes coaxial cables, copper wire and fiber optics, including the wires that comprise bus 202. Transmission media can also take the form of acoustic or light waves, such as those generated during radio-wave and infra-red data communications.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 204 for execution. For example, the instructions may initially be carried on a magnetic disk of a remote computer. The remote computer can load the instructions into its dynamic memory and send the instructions over a telephone line using a modem. A modem local to computer system 200 can receive the data on the telephone line and use an infra-red transmitter to convert the data to an infra-red signal. An infra-red detector can receive the data carried in the infra-red signal and appropriate circuitry can place the data on bus 202. Bus 202 carries the data to main memory 206, from which processor 204 retrieves and executes the instructions. The instructions received by main memory 206 may optionally be stored on storage device 210 either before or after execution by processor 204.

Computer system 200 also includes a communication interface 218 coupled to bus 202. Communication interface 218 provides a two-way data communication coupling to a network link 220 that is connected to a local network 222. For example, communication interface 218 may be an integrated services digital network (ISDN) card or a modem to provide a data communication connection to a corresponding type of telephone line. As another example, communication interface 218 may be a local area network (LAN) card to provide a data communication connection to a compatible LAN. Wireless links may also be implemented. In any such implementation, communication interface 218 sends and receives electrical, electromagnetic or optical signals that carry digital data streams representing various types of information.

Network link 220 typically provides data communication through one or more networks to other data devices. For example, network link 220 may provide a connection through local network 222 to a host computer 224 or to data equipment operated by an Internet Service Provider (ISP) 226. ISP 226 in turn provides data communication services through the worldwide packet data communication network now commonly referred to as the "Internet" 228. Local network 222 and Internet 228 both use electrical, electromagnetic or optical signals that carry digital data streams. The signals through the various networks and the signals on network link 220 and through communication interface 218, which carry the digital data to and from computer system 200, are exemplary forms of carrier waves transporting the information.

Computer system 200 can send messages and receive data, including program code, through the network(s), network link 220 and communication interface 218. In the Internet example, a server 230 might transmit a requested code for an application program through Internet 228, ISP 226, local network 222 and communication interface 218.

Processor 204 may execute the received code as the code is received and/or stored in storage device 210 or other non-volatile storage for later execution. In this manner, computer system 200 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A machine-implemented method for sharing programmatic modules among isolated virtual machines, the method comprising:

copying, from a shareable memory region that is readable by multiple isolated virtual machines, into a first private memory region of a first virtual machine, first data that a second virtual machine (a) loaded from a programmatic module, (b) stored into a second private memory region of the second virtual machine, and (c) copied, from the second private memory region, into the shareable memory region; and establishing a mapping between the first virtual machine and a particular area of the shareable memory region that comprises second data that the second virtual machine (a) loaded from the programmatic module and (b) stored into the particular area of the shareable memory region;

wherein the mapping enables the first virtual machine to read the second data without creating a copy of the second data in any private memory region of the first virtual machine, wherein the first private memory region and the second private memory region both begin at a same virtual address, and wherein:

prior to a time at which the first data exists in the shareable memory region, a reference in the second data refers to a particular virtual memory address within a copy of the first data that is in the second private memory region; and after a time at which the first data exists in the first private memory region, the reference in the second data also refers to the same particular virtual memory address within a copy of the first data that is the first private memory region.

2. The method of claim 1, wherein the first data comprises data that the second virtual machine processed, from a first form that is not usable by the first virtual machine at runtime, into a second form that is usable by both the first virtual machine and the second virtual machine at runtime.

3. The method of claim 1, wherein the programmatic module is a JAVA JAR file, and wherein the first data corresponds to at least one JAVA class.

4. The method of claim 1, wherein, after the first data has been copied into the first private memory region, the second data comprises at least one reference that refers to both (a) a virtual address in the first private memory region and (b) a same virtual address in the second private memory region.

5. The method of claim 1, further comprising:

the first virtual machine using the first data and the second data to execute a program without ever loading any data directly from the programmatic module.

6. The method of claim 1, wherein:

the first data represents mutable entities; and the second data represents immutable entities, but does not represent any mutable entities.

7. The method of claim 1, wherein:

as part of loading the first data from the programmatic module, a second virtual machine selects, from among a plurality of different function pointer vectors, a particular function pointer vector that corresponds to at least one of: (a) a class loader that loads data from the programmatic module and (b) the programmatic module; and as part of loading the first data from the programmatic module, the second virtual machine calls one or more functions to which the particular function pointer vector refers.

8. The method of claim 1, wherein:

as part of loading the first data from the programmatic module, the second virtual machine selects, from among a plurality of separate shareable memory regions, a particular shareable memory region that corresponds to the programmatic module and no other programmatic module; and the second virtual machine copies data from the second private memory region into the particular shareable memory region.

9. A non-transitory machine-readable medium carrying one or more sequences of instructions, which instructions, when executed by one or more processors, cause the one or more processors to carry out steps comprising:

copying, from a shareable memory region that is readable by multiple isolated virtual machines, into a first private memory region of a first virtual machine, first data that a second virtual machine (a) loaded from a programmatic module, (b) stored into a second private memory region of the second virtual machine, and (c) copied, from the second private memory region, into the shareable memory region; and establishing a mapping between the first virtual machine and a particular area of the shareable memory region that comprises second data that the second virtual machine (a) loaded from the programmatic module and (b) stored into to the particular area of the shareable memory region;

wherein the mapping enables the first virtual machine to read the second data without creating a copy of the second data in any private memory region of the first virtual machine, wherein the first private memory region and the second private memory region both begin at a same virtual address, and wherein:
prior to a time at which the first data exists in the shareable memory region, a reference in the second data refers to a particular virtual memory address within a copy of the first data that is in the second private memory region; and after a time at which the first data exists in the first private memory region, the reference in the second data also refers to the same particular virtual memory address within a copy of the first data that is the first private memory region.

10. The non-transitory machine-readable medium of claim 9, wherein the first data comprises data that the second virtual machine processed, from a first form that is not usable by the first virtual machine at runtime, into a second form that is usable by both the first virtual machine and the second virtual machine at runtime.

11. The non-transitory machine-readable medium of claim 9, wherein the programmatic module is a JAVA JAR file, and wherein the first data corresponds to at least one JAVA class.

12. The non-transitory machine-readable medium of claim 9, wherein, after the first data has been copied into the first private memory region, the second data contains at least one reference that refers to both (a) a virtual address in the first private memory region and (b) a same virtual address in the second private memory region.

13. The non-transitory machine-readable medium of claim 9, wherein the steps further comprise:
the first virtual machine using the first data and the second data to execute a program without ever loading any data directly from the programmatic module.

14. The non-transitory machine-readable medium of claim 9, wherein:
the first data represents mutable entities; and
the second data represents immutable entities, but does not represent any mutable entities.

15. The non-transitory machine-readable medium of claim 9, wherein:
as part of loading the first data from the programmatic module, the second virtual machine selects, from among a plurality of different function pointer vectors, a particular function pointer vector that corresponds to at least one of: (a) a class loader that loads data from the programmatic module and (b) the programmatic module; and as part of loading the first data from the programmatic module, the second virtual machine calls one or more functions to which the particular function pointer vector refers.

16. The non-transitory machine-readable medium of claim 9, wherein:
as part of loading the first data from the programmatic module, the second virtual machine selects, from among a plurality of separate shareable memory regions, a particular shareable memory region that corresponds to the programmatic module and no other programmatic module in the plurality; and
the second virtual machine copies data from the second private memory region into the particular shareable memory region.

17. A system comprising:
a programmatic module;
a first virtual machine that (a) loads first data from the programmatic module into a first private memory region of the first virtual machine, (b) loads second data from the programmatic module into a shareable memory region, and (c) copies a processed version of the first data from the first private memory region into the shareable memory region; and
a second virtual machine that (a) maps to the second data in the shareable memory region and (b) loads the processed version of the first data from the shareable memory region into a second private memory region of the second virtual machine;
wherein the first virtual machine is isolated from the second virtual machine, and
wherein:
prior to a time at which the first data exists in the shareable memory region, a reference in the second data refers to a particular virtual memory address within a copy of the first data that is in the first private memory region; and after a time at which the first data exists in the second private memory region, the reference in the second data also refers to the same particular virtual memory address within a copy of the first data that is the second private memory region.

18. The system of claim 17, wherein:
the first private memory region begins at a particular virtual address; and
the second private memory region also begins at the particular virtual address;
wherein the first and second private memory regions begin at different physical addresses.

19. The system of claim 18, wherein:
the second data in the shareable memory region contains one or more references to virtual addresses in a virtual address region that begins at the particular virtual address.

20. The system of claim 18, further comprising:
a third virtual machine that (a) maps to the second data in the shareable memory region and (b) loads the processed version of the first data from the shareable memory region into a third private memory region of the third virtual machine;
wherein the third virtual machine is isolated from the first and second virtual machines.

\* \* \* \* \*